United States Patent
Tsai et al.

(10) Patent No.: US 9,696,523 B1
(45) Date of Patent: Jul. 4, 2017

(54) OPTICAL IMAGING LENS

(71) Applicant: NEWMAX TECHNOLOGY CO., LTD., Tai-Chung (TW)

(72) Inventors: Fei-Hsin Tsai, Tai-Chung (TW); Shu-Tzu Lai, Tai-Chung (TW)

(73) Assignee: Newmax Technology Co., Ltd., Taichung (TW)

( * ) Notice: Subject to any disclaimer, the term of this patent is extended or adjusted under 35 U.S.C. 154(b) by 0 days.

(21) Appl. No.: 14/980,888

(22) Filed: Dec. 28, 2015

(51) Int. Cl.
G02B 9/60 (2006.01)
G02B 13/00 (2006.01)

(52) U.S. Cl.
CPC .......... G02B 13/0045 (2013.01); G02B 9/60 (2013.01)

(58) Field of Classification Search
CPC .............................. G02B 9/60; G02B 13/0045
USPC ......................................................... 359/714
See application file for complete search history.

(56) References Cited

U.S. PATENT DOCUMENTS

| 7,564,635 | B1 | 7/2009 | Tang |
| 7,920,340 | B2 | 4/2011 | Tang |
| 8,605,368 | B2 | 12/2013 | Tsai et al. |
| 8,649,113 | B1 | 2/2014 | Tsai et al. |
| 2013/0033637 | A1* | 2/2013 | Sano .................. G02B 13/0045 348/340 |

FOREIGN PATENT DOCUMENTS

| TW | 201339632 A | 10/2013 |
| TW | 201403121 A | 1/2014 |

* cited by examiner

Primary Examiner — Thomas K Pham
Assistant Examiner — Mitchell Oestreich
(74) Attorney, Agent, or Firm — Gemini Patent Services

(57) ABSTRACT

An optical imaging lens includes, in order from an object side to an image side: a stop, a first lens element with a positive refractive power, a second lens element with a negative refractive power, a third lens element with a refractive power, a fourth lens element with a positive refractive power, and a fifth lens element with a negative refractive power. A focal length of the second lens element, the third lens element and the fourth lens element combined is f234, a focal length of the fifth lens element is f5, and they satisfy the relation: −1.8<f234/f5<−1.0, so that the optical imaging lens would have an appropriate refractive power, and spherical aberration and astigmatism can also be reduced.

18 Claims, 6 Drawing Sheets

OPTICAL IMAGING LENS

BACKGROUND OF THE INVENTION

Field of the Invention

The present invention relates to an optical imaging lens, and more particularly to a miniaturized five-piece optical imaging lens applicable to electronic products.

Related Prior Art

Currently, small imaging lens with high image quality has become the standard equipment for mobile devices. In addition, as the advanced semiconductor manufacturing technologies have allowed the pixel size of image sensors to be reduced and compact, there's an increasing demand for imaging lens featuring finer resolution and better image quality.

A conventional imaging lens used in mobile devices, such as, mobile phone, tablet computer and other wearable electronic devices, usually consists of three to four lens elements: such as the imaging lenses described in U.S. Pat. Nos. 7,564,635 and 7,920,340, which cannot obtain better image quality. The imaging lenses consisting of five lens elements disclosed in U.S. Pat. Nos. 8,605,368, 8,649,113 and TW Appl. Nos. 102137030 and 102121155 have better image quality, however, the sensitivity problem during manufacturing and assembling processes is often existed while having a large aperture value, increasing the production cost. Or the peripheral image quality will be reduced while reducing the assembly tolerance, causing the peripheral imaging vague or deformed.

The present invention has arisen to mitigate and/or obviate the afore-described disadvantages.

SUMMARY

The present invention is aimed at providing a five-piece optical imaging lens with high resolution, low distortion, and low manufacturing tolerances.

Therefore, an optical imaging lens in accordance with the present invention includes: a stop; a first lens element with a positive refractive power, having an object-side surface being convex near an optical axis and an image-side surface being convex near the optical axis, at least one of the object-side surface and the image-side surface of the first lens element being aspheric; a second lens element with a negative refractive power, having an object-side surface being convex near the optical axis, at least one of the object-side surface and the image-side surface of the second lens element being aspheric; a third lens element with refractive power having an image-side surface being concave near the optical axis, at least one of the object-side surface and the image-side surface of the third lens element being aspheric; a fourth lens element with a positive refractive power, having an object-side surface being concave near the optical axis and an image-side surface being convex near the optical axis, at least one of the object-side surface and the image-side surface of the fourth lens element being aspheric; a fifth lens element with a negative refractive power, having an object-side surface being concave near the optical axis and an image-side surface being concave near the optical axis, at least one of the object-side surface and the image-side surface being aspheric and provided with at least one inflection point.

A focal length of the second lens element, the third lens element and the fourth lens element combined is f234, a focal length of the fifth lens element is f5, and they satisfy the relation: $-1.8 < f234/f5 < -1.0$, so that the optical imaging lens would have an appropriate refractive power, and spherical aberration and astigmatism can also be reduced.

Preferably, each of the second and third lens elements has an image-side surface being concave near the optical axis.

Preferably, a focal length of the first lens element is f1, a focal length of the second lens element is f2, and they satisfy the relation: $-0.75 < f1/f2 < -0.4$, so that the refractive power of the first lens element and the second lens element are more suitable, it will be favorable to obtain a wide field of view and avoid the excessive increase of aberration of the system.

Preferably, a focal length of the second lens element is f2, a focal length of the fourth lens element is f4, and they satisfy the relation: $-2.6 < f2/f4 < -1.8$, which is favorable to improve the property of the wide field of view and large stop, while reducing the sensitivity of the optical imaging lens, making the manufacturing process easier.

Preferably, a focal length of the fourth lens element is f4, the focal lens of the fifth lens element is f5, and they satisfy the relation: $-1.35 < f4/f5 < -0.9$, which can effectively reduce the back focal length and facilitates the miniaturization of the optical imaging lens.

Preferably, a focal length of the first lens element is f1, a focal length of the third lens element is f3, and they satisfy the relation: $-0.1 < f1/f3 < 0.15$, which can maintain the balance of the refractive power to achieve an optimum imaging effect.

Preferably, a focal length of the second lens element is f2, a focal lens of the fifth lens element is f5, and they satisfy the relation: $1.8 < f2/f5 < 3.1$, which can effectively reduce the total length of the optical imaging lens, and facilitate the miniaturization of the same.

Preferably, a focal length of the first lens element is f1, a focal length of the fourth lens element is f4, and they satisfy the relation: $0.9 < f1/f4 < 1.5$, which can maintain the balance of the refractive power to achieve an optimum imaging effect.

Preferably, a focal length of the first lens element is f1, a focal length of the second lens element and the third lens element combined is f23, and they satisfy the relation: $-0.7 < f1/f23 < -0.5$, which can maintain the balance of the refractive power to achieve an optimum imaging effect.

Preferably, a focal length of the second lens element and the third lens element combined is f23, a focal length of the fourth lens element and the fifth lens element combined is f45, and they satisfy the relation: $-0.35 < f23/f45 < -0.05$. When this relation is satisfied, the above relation, a wide field of view, big stop, high pixel and low height can be provided and the resolution can be improved evidently. Otherwise, the performance and resolution of the optical lens system with a wide field of view will be reduced, and the yield rate will be low.

Preferably, a focal length of the first lens element and the second lens element combined is f12, a focal length of the third lens element and the fourth lens element combined is f34, and they satisfy the relation: $1.4 < f12/f34 < 2.8$. When this relation is satisfied, the above relation, a wide field of view, big stop, high pixel and low height can be provided and the resolution can be improved evidently. Otherwise, the performance and resolution of the optical lens system with a wide field of view will be reduced, and the yield rate will be low.

Preferably, a focal length of the third lens element and the fourth lens element combined is f34, the focal length of the fifth lens element is f5, and they satisfy the relation: $-1.4 < f34/f5 < -0.9$. When this relation is satisfied, the above relation, a wide field of view, big stop, high pixel and low height can be provided and the resolution can be improved evidently. Otherwise, the performance and resolution of the optical lens system with a wide field of view will be reduced, and the yield rate will be low.

Preferably, a focal length of the first lens element is f1, a focal length of the second lens element, the third lens element 130 and the fourth lens element combined is f234, and they satisfy the relation: $0.6<f1/f234<1.5$, so that the optical imaging lens would have an appropriate refractive power, and spherical aberration and astigmatism can also be reduced.

Preferably, a focal length of the second lens element and the third lens element combined is f23, a focal length of the fourth lens element is f4, and they satisfy the relation: $f23/f4<-1.5$, which is favorable to improve the property of the wide field of view and large stop, while reducing the sensitivity of the optical imaging lens, making the manufacturing process easier.

Preferably, a focal length of the first lens element, the second lens element and the third lens element combined is f123, a focal length of the fourth lens element is f4, and they satisfy the relation: $1.6<f123/f4<2.7$, so that the optical imaging lens would have an appropriate refractive power, and spherical aberration and astigmatism can also be reduced.

Preferably, a focal length of the first lens element, the second lens element and the third lens element combined is f123, a focal length of the fourth lens element and the fifth lens element combined is f45, and they satisfy the relation: $0.05<f123/f45<0.4$, so that the optical imaging lens would have an appropriate refractive power, and spherical aberration and astigmatism can also be reduced.

Preferably, an Abbe number of the first lens element is V1, an Abbe number of the second lens element is V2, and they satisfy the following relation: $30<V1-V2<42$, so that the chromatic aberration of the optical imaging lens can be modified.

Preferably, an Abbe number of the fourth lens element is V4, an Abbe number of the third lens element is V3, and they satisfy the following relation: $30<V4-V3<42$, so that the chromatic aberration of the optical imaging lens can be modified.

Preferably, a focal length of the optical imaging lens is f, a distance from the object-side surface of the first lens element to the image plane along the optical axis is TL, and they satisfy the relation: $0.6<f/TL<0.95$. When this relation is satisfied, it will be favorable to obtain a wide field of view and maintain the objective of miniaturization of the optical lens system with a wide field of view, and the lens system can be used in thin and light electronic products.

DETAILED DESCRIPTION

The present invention will be clearer from the following description when viewed together with the accompanying drawings, which show, for purpose of illustrations only, the preferred embodiment in accordance with the present invention.

Figure 1A:
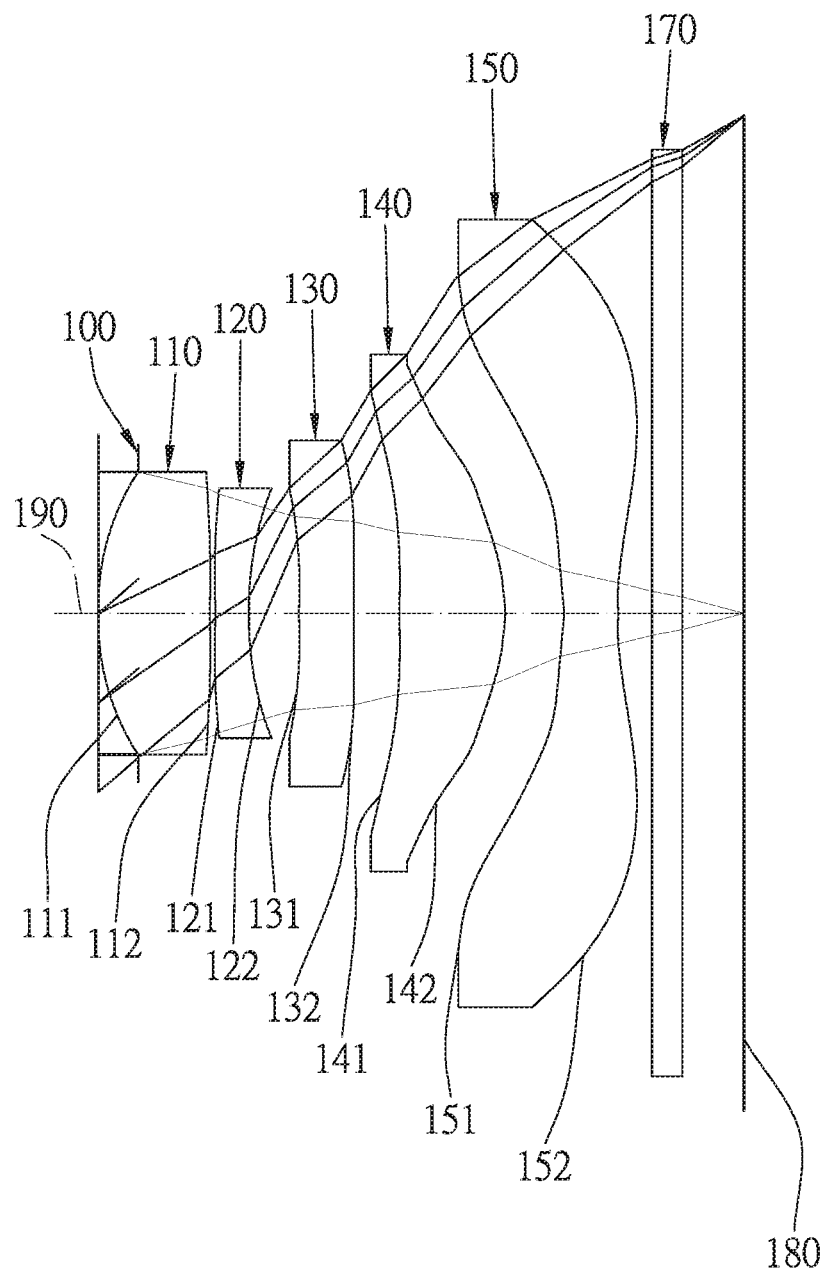
FIG. 1A shows an optical imaging lens in accordance with a first embodiment of the present invention.
Figure 1B:
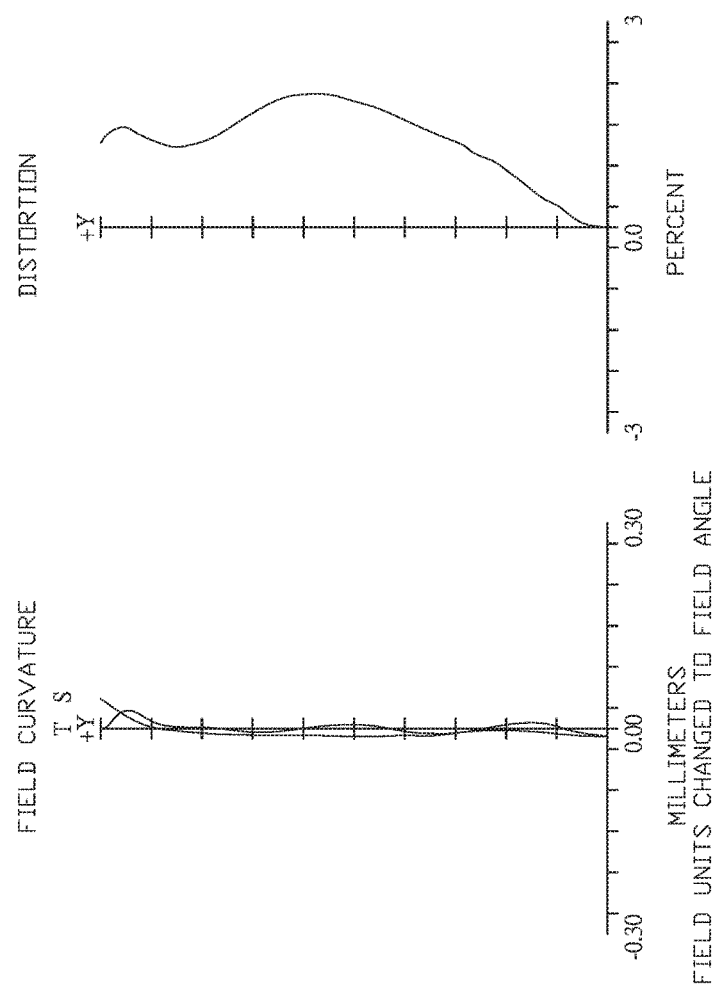
FIG. 1B shows the longitudinal spherical aberration curve, the astigmatic field curve and the distortion curve of the first embodiment of the present invention.

Referring to FIGS. 1A and 1B, FIG. 1A shows an optical imaging lens in accordance with a first embodiment of the present invention, and FIG. 1B shows, in order from left to right, the longitudinal spherical aberration curves, the astigmatic field curves, and the distortion curve of the first embodiment of the present invention. An optical imaging lens in accordance with the first embodiment of the present invention comprises a stop 100 and a lens group. The lens group comprises, in order from an object side to the image side: a first lens element 110, a second lens element 120, a third lens element 130, a fourth lens element 140, a fifth lens element 150, an IR cut filter 170 which is made of glass, and an image plane 180, wherein the optical imaging lens has a total of five lens elements with refractive power. The stop 100 is disposed between an image-side surface 112 of the first lens element 110 and an object to be imaged.

The first lens element 110 with a positive refractive power has an object-side surface 111 being convex near an optical axis 190 and an image-side surface 112 being convex near the optical axis 190, the object-side surface 111 and the image-side surface 112 are aspheric, and the first lens element 110 is made of plastic material.

The second lens element 120 with a negative refractive power has an object-side surface 121 being convex near the optical axis 190 and an image-side surface 122 being concave near the optical axis 190, the object-side surface 121 and the image-side surface 122 are aspheric, and the second lens element 120 is made of plastic material.

The third lens element 130 with a negative refractive power has an object-side surface 131 being convex near the optical axis 190 and an image-side surface 132 being concave near the optical axis 190, the object-side surface 131 and the image-side surface 132 are aspheric, and the third lens element 130 is made of plastic material.

The fourth lens element 140 with a positive refractive power has an object-side surface 141 being concave near the optical axis 190 and an image-side surface 142 being convex near the optical axis 190, the object-side surface 141 and the image-side surface 142 are aspheric, and the fourth lens element 140 is made of plastic material.

The fifth lens element 150 with a negative refractive power has an object-side surface 151 being concave near the optical axis 190 and an image-side surface 152 being concave near the optical axis 190, the object-side surface 151 and the image-side surface 152 are aspheric, the fifth lens element 150 is made of plastic material, and at least one of the object-side surface 151 and the image-side surface 152 is provided with at least one inflection point.

The IR cut filter 170 made of glass is located between the fifth lens element 150 and the image plane 180 and has no influence on the focal length of the optical imaging lens.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A、 B、 C、 D、 E、 G、 . . . : represent the high-order aspheric coefficients.

In the first embodiment of the present optical imaging lens, the focal length of the optical imaging lens is f, the f-number of the optical imaging lens is Fno, the optical imaging lens has a maximum view angle (field of view) FOV, and they satisfy the relations:

$f$=3.710 mm;

Fno=2.0; and

FOV=78 degrees.

In the first embodiment of the present optical imaging lens, a focal length of the first lens element 110 is f1, a focal length of the second lens element 120 is f2, and they satisfy the relation: f1/f2=−0.5210.

In the first embodiment of the present optical imaging lens, a focal length of the second lens element 120 is f2, a focal length of the fourth lens element 140 is f4, and they satisfy the relation: f2/f4=−2.0249.

In the first embodiment of the present optical imaging lens, a focal length of the fourth lens element 140 is f4, a focal lens of the fifth lens element 150 is f5, and they satisfy the relation: f4/f5=−1.1917.

In the first embodiment of the present optical imaging lens, the focal length of the first lens element 110 is f1, the focal length of the third lens element 130 is f3, and they satisfy the relation: f1/f3=−0.0860.

In the first embodiment of the present optical imaging lens, a focal length of the second lens element 120 is f2, a focal lens of the fifth lens element 150 is f5, and they satisfy the relation: f2/f5=2.4131.

In the first embodiment of the present optical imaging lens, the focal length of the first lens element 110 is f1, a focal length of the fourth lens element 140 is f4, and they satisfy the relation: f1/f4=1.0549.

In the first embodiment of the present optical imaging lens, the focal length of the first lens element 110 is f1, a focal length of the second lens element 120 and the third lens element 130 combined is f23, and they satisfy the relation: f1/f23=−0.6159.

In the first embodiment of the present optical imaging lens, a focal length of the second lens element 120 and the third lens element 130 combined is f23, a focal length of the fourth lens element 140 and the fifth lens element 150 combined is f45, and they satisfy the relation: f23/f45=−0.0622.

In the first embodiment of the present optical imaging lens, a focal length of the first lens element 110 and the second lens element 120 combined is f12, a focal length of the third lens element 130 and the fourth lens element 140 combined is f34, and they satisfy the relation: f12/f34=1.6071.

In the first embodiment of the present optical imaging lens, a focal length of the third lens element 130 and the fourth lens element 140 combined is f34, a focal length of the fifth lens element 150 is f5, and they satisfy the relation: f34/f5=−1.2606.

In the first embodiment of the present optical imaging lens, a focal length of the first lens element 110 is f1, a focal length of the second lens element 120, the third lens element 130 and the fourth lens element 140 combined is f234, and they satisfy the relation: f1/f234=0.7515.

In the first embodiment of the present optical imaging lens, a focal length of the second lens element 120, the third lens element 130 and the fourth lens element 140 combined is f234, a focal length of the fifth lens element 150 is f5, and they satisfy the relation: f234/f5=−1.6727.

In the first embodiment of the present optical imaging lens, a focal length of the first lens element 110, the second lens element 120 and the third lens element 130 combined is f123, a focal length of the fourth lens element 140 is f4, and they satisfy the relation: f123/f4=1.8554.

In the first embodiment of the present optical imaging lens, a focal length of the first lens element 110, the second lens element 120 and the third lens element 130 combined is f123, a focal length of the fourth lens element 140 and the fifth lens element 150 combined is f45, and they satisfy the relation: f123/f45=0.0674.

In the first embodiment of the present optical imaging lens, an Abbe number of the first lens element 110 is V1, an Abbe number of the second lens element 120 is V2, and they satisfy the following relation: V1−V2=34.5.

In the first embodiment of the present optical imaging lens, an Abbe number of the fourth lens element 140 is V4, an Abbe number of the third lens element 130 is V3, and they satisfy the following relation: V4−V3=34.5.

In the first embodiment of the present optical imaging lens, the focal length of the optical imaging lens is f, a distance from the object-side surface 111 of the first lens element 110 to the image plane 180 along the optical axis 190 is TL, and they satisfy the relation: f/TL=0.8281.

The detailed optical data of the first embodiment is shown in table 1, and the aspheric surface data is shown in table 2.

TABLE 1

Embodiment 1
f(focal length) = 3.710 mm, Fno = 2.0, FOV = 78 deg.

| Surface | | Curvature Radius | Thickness | Material | index | Abbe # | Focal length |
|---|---|---|---|---|---|---|---|
| 0 | object | Infinity | Infinity | | | | |
| 1 | | Infinity | 0.274 | | | | |
| 2 | stop | Infinity | −0.274 | | | | |
| 3 | Lens 1 | 1.490 (ASP) | 0.774 | plastic | 1.544 | 56.000 | 2.651 |
| 4 | | −42.295 (ASP) | 0.030 | | | | |

TABLE 1-continued

Embodiment 1
f(focal length) = 3.710 mm, Fno = 2.0, FOV = 78 deg.

| Surface | | Curvature Radius | | Thickness | Material | index | Abbe # | Focal length |
|---|---|---|---|---|---|---|---|---|
| 5 | Lens 2 | 8.632 | (ASP) | 0.240 | plastic | 1.651 | 21.500 | −5.089 |
| 6 | | 2.386 | (ASP) | 0.340 | | | | |
| 7 | Lens 3 | 487.436 | (ASP) | 0.391 | plastic | 1.651 | 21.500 | −30.842 |
| 8 | | 19.481 | (ASP) | 0.320 | | | | |
| 9 | Lens 4 | −11.365 | (ASP) | 0.730 | plastic | 1.544 | 56.000 | 2.513 |
| 10 | | −1.253 | (ASP) | 0.407 | | | | |
| 11 | Lens 5 | −2.632 | (ASP) | 0.370 | plastic | 1.535 | 56.000 | −2.109 |
| 12 | | 2.087 | (ASP) | 0.243 | | | | |
| 13 | IR cut filter | Infinity | | 0.210 | glass | 1.517 | 64.167 | — |
| 14 | | Infinity | | 0.425 | | | | |
| 15 | Image plane | Infinity | | Infinity | | | | |

TABLE 2

Aspheric Coefficients

| surface | 3 | 4 | 5 | 6 | 7 |
|---|---|---|---|---|---|
| K: | −6.7128E+00 | 9.1402E+01 | 7.6083E+01 | −2.7332E+00 | −1.0929E+02 |
| A: | 2.4117E−01 | −1.1528E−01 | −1.4185E−01 | −2.4790E−02 | −1.8911E−01 |
| B: | −2.1917E−01 | 5.4038E−01 | 6.9579E−01 | 3.2744E−01 | 9.5278E−02 |
| C: | 1.7426E−01 | −1.1092E+00 | −1.3229E+00 | −4.4953E−01 | −1.5568E−01 |
| D: | −4.0340E−02 | 6.9886E−01 | 9.6752E−01 | 4.9132E−01 | 1.4255E−01 |
| E: | −7.8550E−02 | 2.4932E−01 | 4.9489E−02 | −3.7671E−01 | 2.8059E−02 |
| F: | 3.9163E−02 | −3.4393E−01 | −2.6687E−01 | 2.5087E−01 | −1.2192E−01 |

| surface | 8 | 9 | 10 | 11 | 12 |
|---|---|---|---|---|---|
| K: | −3.7279E+01 | 9.9764E+00 | −7.1985E+00 | −4.4848E+00 | −4.6404E+00 |
| A: | −1.5172E−01 | −7.2520E−02 | −2.5239E−01 | −2.9750E−02 | −1.1671E−01 |
| B: | 8.6264E−02 | 7.4427E−02 | 3.7102E−01 | −6.0270E−02 | 4.6565E−02 |
| C: | −9.2940E−02 | −1.8798E−01 | −4.0644E−01 | 4.7818E−02 | −1.3470E−02 |
| D: | 9.1565E−02 | 1.9442E−01 | 2.4382E−01 | −1.3160E−02 | 2.1750E−03 |
| E: | −2.3950E−02 | −7.9310E−02 | −6.9000E−02 | 1.6260E−03 | 1.8100E−04 |
| F: | −4.5700E−03 | 1.1268E−02 | 7.3340E−03 | 6.3200E−06 | 7.9200E−08 |

The units of the radius of curvature, the thickness and the focal length in table 1 are expressed in mm, the surface numbers 0-15 represent the surfaces sequentially arranged from the object-side to the image-side along the optical axis. In table 2, k represents the conic coefficient of the equation of the aspheric surface profiles, and A、 B、 C、 D、 E、 G、 ... : represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
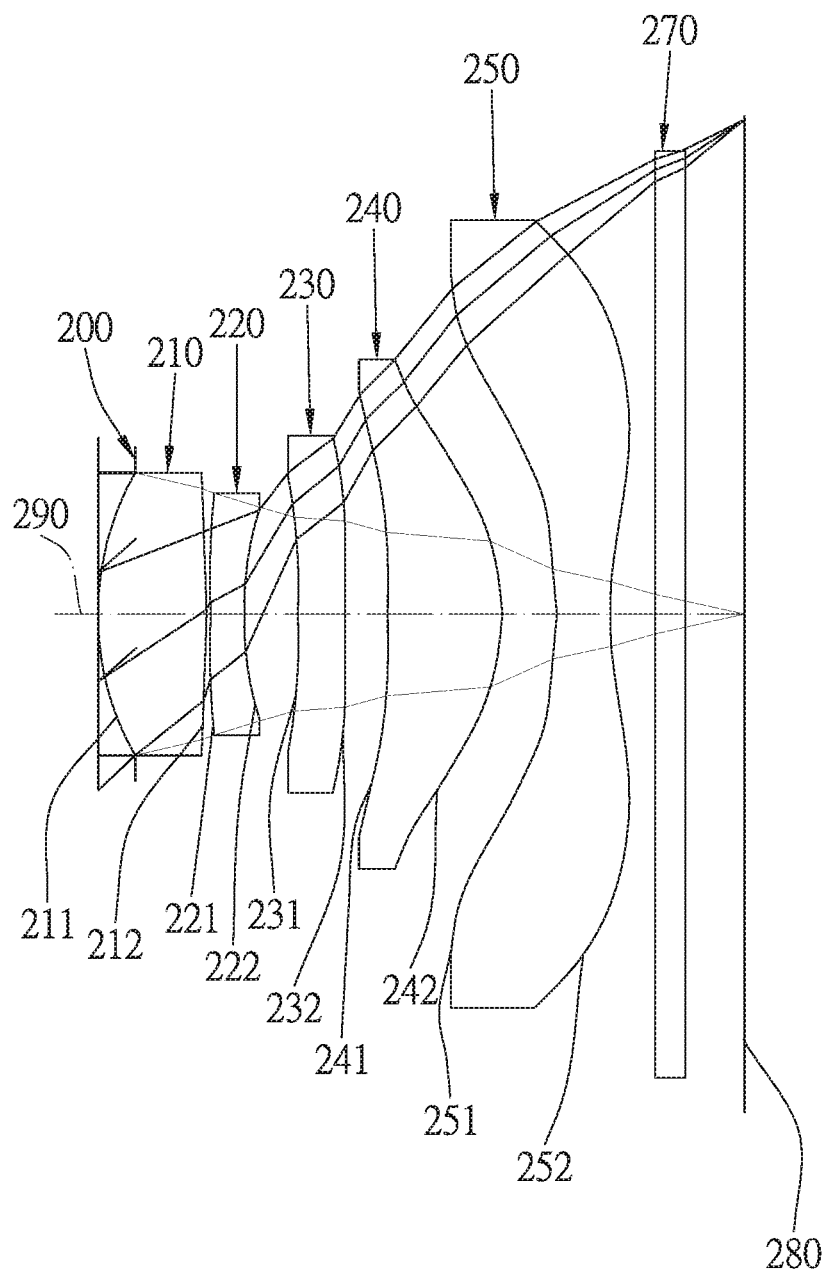
FIG. 2A shows an optical imaging lens in accordance with a second embodiment of the present invention.
Figure 2B:
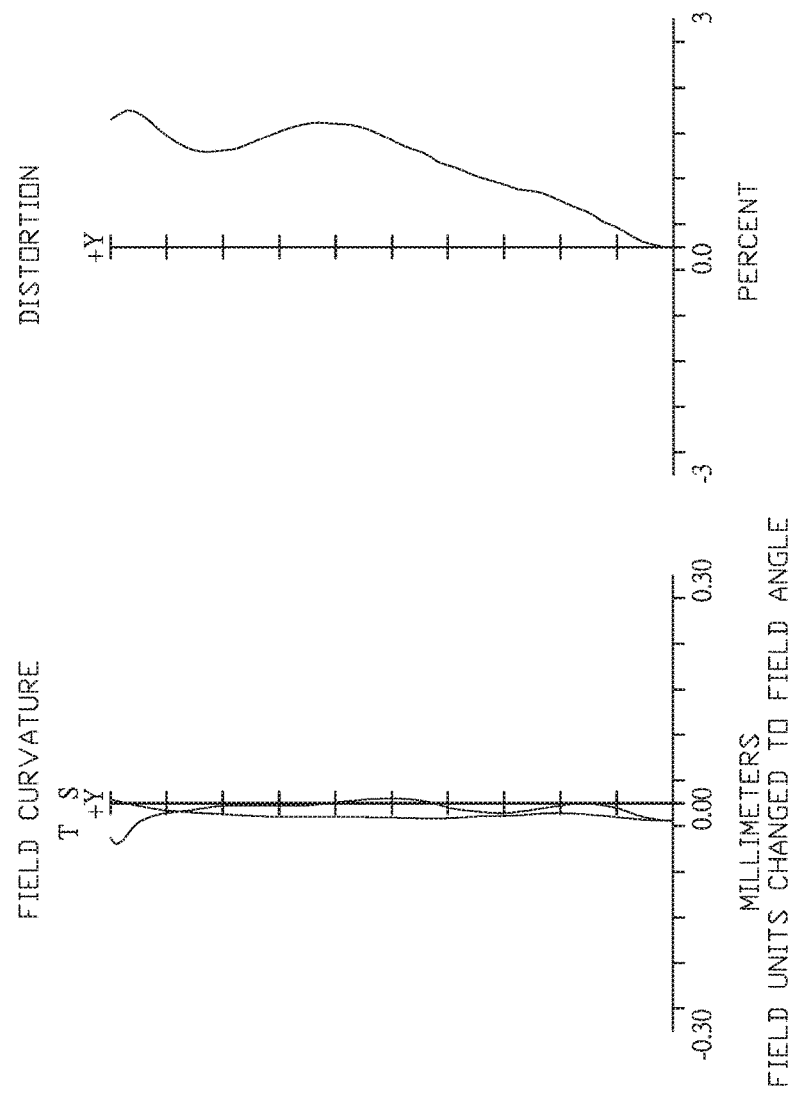
FIG. 2B shows the longitudinal spherical aberration curve, the astigmatic field curve and the distortion curve of the second embodiment of the present invention.

Referring to FIGS. 2A and 2B, FIG. 2A shows an optical imaging lens in accordance with a second embodiment of the present invention, and FIG. 2B shows, in order from left to right, the longitudinal spherical aberration curves, the astigmatic field curves, and the distortion curve of the second embodiment of the present invention. An optical imaging lens in accordance with the second embodiment of the present invention comprises a stop 200 and a lens group. The lens group comprises, in order from an object side to the image side: a first lens element 210, a second lens element 220, a third lens element 230, a fourth lens element 240, a fifth lens element 250, an IR cut filter 270 which is made of glass, and an image plane 280, wherein the optical imaging lens has a total of five lens elements with refractive power.

The stop 200 is disposed between an image-side surface 212 of the first lens element 210 and an object to be imaged.

The first lens element 210 with a positive refractive power has an object-side surface 211 being convex near an optical axis 290 and an image-side surface 212 being convex near the optical axis 290, the object-side surface 211 and the image-side surface 212 are aspheric, and the first lens element 210 is made of plastic material.

The second lens element 220 with a negative refractive power has an object-side surface 221 being convex near the optical axis 290 and an image-side surface 222 being concave near the optical axis 290, the object-side surface 221 and the image-side surface 222 are aspheric, and the second lens element 220 is made of plastic material.

The third lens element 230 with a negative refractive power has an object-side surface 231 being convex near the optical axis 290 and an image-side surface 232 being concave near the optical axis 290, the object-side surface 231 and the image-side surface 232 are aspheric, and the third lens element 230 is made of plastic material.

The fourth lens element 240 with a positive refractive power has an object-side surface 241 being concave near the optical axis 290 and an image-side surface 242 being convex near the optical axis 290, the object-side surface 241 and the image-side surface 242 are aspheric, and the fourth lens element 240 is made of plastic material.

The fifth lens element 250 with a negative refractive power has an object-side surface 251 being concave near the optical axis 290 and an image-side surface 252 being concave near the optical axis 290, the object-side surface 251 and the image-side surface 252 are aspheric, the fifth lens element 250 is made of plastic material, and at least one of the object-side surface 251 and the image-side surface 252 is provided with at least one inflection point.

The IR cut filter 270 made of glass is located between the fifth lens element 250 and the image plane 280 and has no influence on the focal length of the optical imaging lens.

The detailed optical data of the second embodiment is shown in table 3, and the aspheric surface data is shown in table 4.

Moreover, these parameters can be calculated from Table 3 and Table 4 as the following values and satisfy the following conditions:

| | Embodiment 2 | | |
|---|---|---|---|
| f | 3.669 | f23/f45 | −0.1203 |
| Fno | 2.0 | f12/f34 | 1.9771 |
| FOV | 78 | f34/f5 | −1.2295 |
| f1/f2 | −0.5222 | f1/f234 | 1.0173 |
| f2/f4 | −2.4184 | f234/f5 | −1.4614 |
| f4/f5 | −1.1771 | f123/f4 | 2.2297 |
| f1/f3 | −0.0778 | f123/f45 | 0.1298 |
| f2/f5 | 2.8468 | V1-V2 | 34.5 |

TABLE 3

Embodiment 2
f(focal length) = 3.669 mm, Fno = 2.0, FOV = 78 deg.

| Surface | | Curvature Radius | Thickness | Material | index | Abbe # | Focal length |
|---|---|---|---|---|---|---|---|
| 0 | object | Infinity | Infinity | | | | |
| 1 | | Infinity | 0.260 | | | | |
| 2 | stop | Infinity | −0.260 | | | | |
| 3 | Lens 1 | 1.530 (ASP) | 0.747 | plastic | 1.544 | 56.000 | 2.687 |
| 4 | | −30.087 (ASP) | 0.030 | | | | |
| 5 | Lens 2 | 10.228 (ASP) | 0.240 | plastic | 1.651 | 21.500 | −5.145 |
| 6 | | 2.520 (ASP) | 0.364 | | | | |
| 7 | Lens 3 | 21.627 (ASP) | 0.325 | plastic | 1.651 | 21.500 | −34.515 |
| 8 | | 11.013 (ASP) | 0.316 | | | | |
| 9 | Lens 4 | −11.011 (ASP) | 0.783 | plastic | 1.544 | 56.000 | 2.127 |
| 10 | | −1.078 (ASP) | 0.374 | | | | |
| 11 | Lens 5 | −1.809 (ASP) | 0.382 | plastic | 1.544 | 56.000 | −1.807 |
| 12 | | 2.335 (ASP) | 0.292 | | | | |
| 13 | IR cut filter | Infinity | 0.210 | glass | 1.517 | 64.167 | — |
| 14 | | Infinity | 0.425 | | | | |
| 15 | Image plane | Infinity | Infinity | | | | |

TABLE 4

Aspheric Coefficients

| Surface | 3 | 4 | 5 | 6 | 7 |
|---|---|---|---|---|---|
| K: | −7.4064E+00 | 3.0584E+02 | 1.0624E+02 | −2.7040E+00 | 3.1705E+02 |
| A: | 2.4064E−01 | −1.1730E−01 | −1.4377E−01 | −2.3950E−02 | −2.0952E−01 |
| B: | −2.2328E−01 | 5.2701E−01 | 7.1457E−01 | 3.4061E−01 | 1.2376E−01 |
| C: | 1.6608E−01 | −1.0625E+00 | −1.3393E+00 | −4.8589E−01 | −1.5496E−01 |
| D: | −3.8050E−02 | 6.9200E−01 | 9.3369E−01 | 4.7101E−01 | 1.3746E−01 |
| E: | −6.3510E−02 | 1.0041E−01 | 4.3264E−02 | −2.4950E−02 | 4.7264E−02 |
| F: | 2.6360E−02 | −2.0450E−01 | −2.2371E−01 | 1.0493E−01 | −9.2230E−02 |

| surface | 8 | 9 | 10 | 11 | 12 |
|---|---|---|---|---|---|
| K: | −8.9526E+01 | −6.9693E+00 | −5.6263E+00 | −9.9648E+00 | −1.1857E+00 |
| A: | −1.6110E−01 | −6.9940E−02 | −2.4607E−01 | −3.7120E−02 | −1.3574E−01 |
| B: | 8.5108E−02 | 7.4813E−02 | 3.7088E−01 | −5.9850E−02 | 4.8053E−02 |
| C: | −8.5970E−02 | −1.8888E−01 | −4.0599E−01 | 4.7889E−02 | −1.3270E−02 |
| D: | 9.4458E−02 | 1.9439E−01 | 2.4380E−01 | −1.3160E−02 | 2.1530E−03 |
| E: | −2.4910E−02 | −7.9350E−02 | −6.9080E−02 | 1.6260E−03 | −1.8000E−04 |
| F: | −5.0800E−03 | 1.1100E−02 | 7.3040E−03 | −7.7100E−05 | 6.3000E−06 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

-continued

| | Embodiment 2 | | |
|---|---|---|---|
| f1/f4 | 1.2630 | V4-V3 | 34.5 |
| f1/f23 | −0.6110 | f/TL | 0.8175 |
| f23/f4 | −2.0671 | | |

Figure 3A:
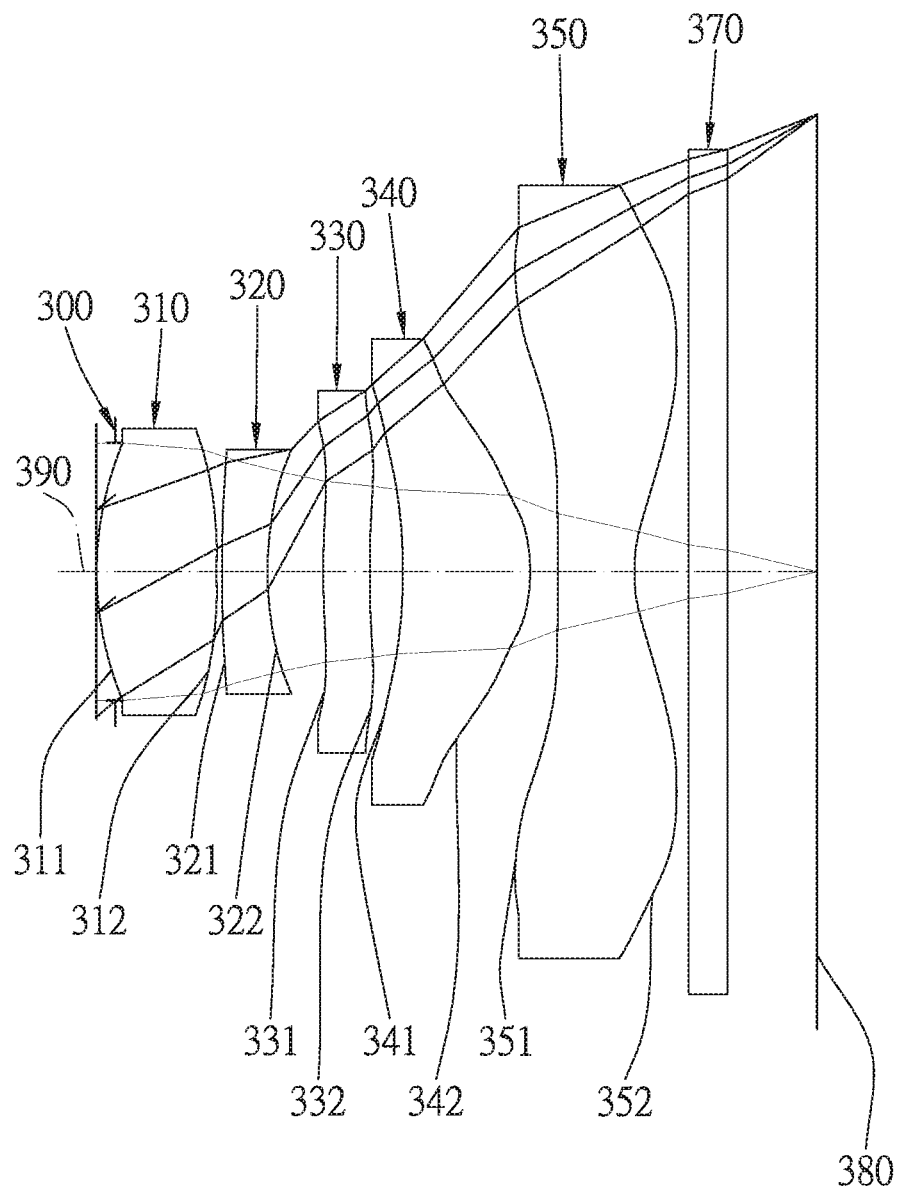
FIG. 3A shows an optical imaging lens in accordance with a third embodiment of the present invention.
Figure 3B:
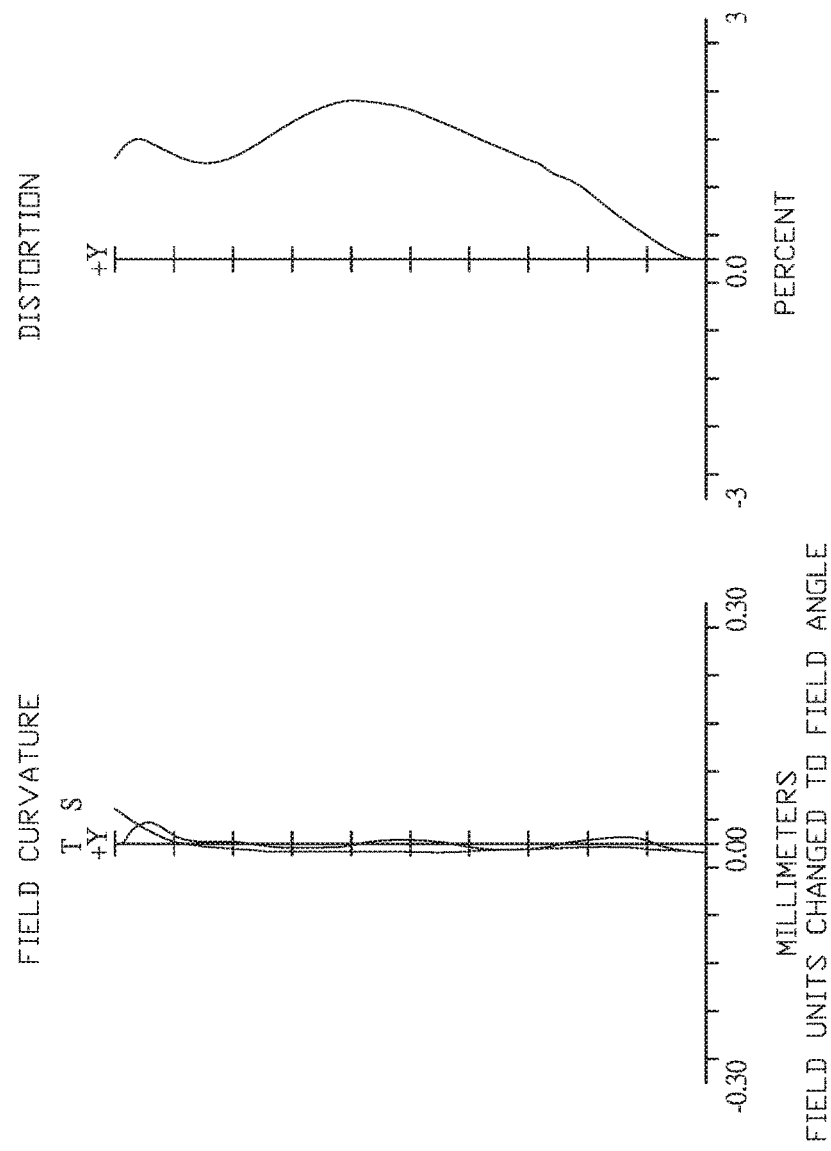
FIG. 3B shows the longitudinal spherical aberration curve, the astigmatic field curve and the distortion curve of the third embodiment of the present invention.

Referring to FIGS. 3A and 3B, FIG. 3A shows an optical imaging lens in accordance with a third embodiment of the present invention, and FIG. 3B shows, in order from left to right, the longitudinal spherical aberration curves, the astigmatic field curves, and the distortion curve of the third embodiment of the present invention. An optical imaging lens in accordance with the third embodiment of the present invention comprises a stop 300 and a lens group. The lens group comprises, in order from an object side to the image side: a first lens element 310, a second lens element 320, a third lens element 330, a fourth lens element 340, a fifth lens element 350, an IR cut filter 370 which is made of glass, and an image plane 380, wherein the optical imaging lens has a total of five lens elements with refractive power. The stop 300 is disposed between an image-side surface 312 of the first lens element 310 and an object to be imaged.

The first lens element 310 with a positive refractive power has an object-side surface 311 being convex near an optical axis 390 and an image-side surface 312 being convex near the optical axis 390, the object-side surface 311 and the image-side surface 312 are aspheric, and the first lens element 310 is made of plastic material.

The second lens element 320 with a negative refractive power has an object-side surface 321 being convex near the optical axis 390 and an image-side surface 322 being concave near the optical axis 390, the object-side surface 321 and the image-side surface 322 are aspheric, and the second lens element 320 is made of plastic material.

The third lens element 330 with a positive refractive power has an object-side surface 331 being convex near the optical axis 390 and an image-side surface 333 being concave near the optical axis 390, the object-side surface 331 and the image-side surface 333 are aspheric, and the third lens element 330 is made of plastic material.

The fourth lens element 340 with a positive refractive power has an object-side surface 341 being concave near the optical axis 390 and an image-side surface 342 being convex near the optical axis 390, the object-side surface 341 and the image-side surface 342 are aspheric, and the fourth lens element 340 is made of plastic material.

The fifth lens element 350 with a negative refractive power has an object-side surface 351 being concave near the optical axis 390 and an image-side surface 352 being concave near the optical axis 390, the object-side surface 351 and the image-side surface 352 are aspheric, the fifth lens element 350 is made of plastic material, and at least one of the object-side surface 351 and the image-side surface 352 is provided with at least one inflection point.

The IR cut filter 370 made of glass is located between the fifth lens element 350 and the image plane 380 and has no influence on the focal length of the optical imaging lens.

The detailed optical data of the third embodiment is shown in table 5, and the aspheric surface data is shown in table 6.

TABLE 5

Embodiment 3
f(focal length) = 2.894 mm, Fno = 2.0, FOV = 79 deg.

| Surface | | Curvature Radius | Thickness | Material | index | Abbe # | Focal length |
|---|---|---|---|---|---|---|---|
| 0 | object | Infinity | Infinity | | | | |
| 1 | | Infinity | 0.100 | | | | |
| 2 | stop | Infinity | −0.100 | | | | |
| 3 | Lens 1 | 1.597 (ASP) | 0.634 | plastic | 1.544 | 56.000 | 2.021 |
| 4 | | −3.077 (ASP) | 0.026 | | | | |
| 5 | Lens 2 | 7.474 (ASP) | 0.240 | plastic | 1.651 | 21.500 | −3.041 |
| 6 | | 1.559 (ASP) | 0.297 | | | | |
| 7 | Lens 3 | 3.889 (ASP) | 0.246 | plastic | 1.651 | 21.500 | 49.622 |
| 8 | | 4.304 (ASP) | 0.175 | | | | |
| 9 | Lens 4 | −2.362 (ASP) | 0.676 | plastic | 1.544 | 56.000 | 1.514 |
| 10 | | −0.674 (ASP) | 0.142 | | | | |
| 11 | Lens 5 | −72.042 (ASP) | 0.404 | plastic | 1.535 | 56.000 | −1.424 |
| 12 | | 0.775 (ASP) | 0.284 | | | | |
| 13 | IR cut filter | Infinity | 0.210 | glass | 1.517 | 64.167 | — |
| 14 | | Infinity | 0.471 | | | | |
| 15 | Image plane | Infinity | Infinity | | | | |

TABLE 6

Aspheric coefficients

| surface | 3 | 4 | 5 | 6 | 7 |
|---|---|---|---|---|---|
| K: | −1.2558E+01 | −1.8142E+01 | 7.3940E+01 | −6.3484E+00 | −7.5202E+01 |
| A: | 3.3034E−01 | 4.2063E−02 | 1.2696E−02 | −1.0900E−03 | −7.6970E−02 |
| B: | −7.3460E−01 | −1.6975E−01 | 3.2336E−01 | 7.3576E−01 | −1.1819E+00 |
| C: | 1.1805E+00 | −1.4745E+00 | −2.2612E+00 | −2.0928E+00 | 4.2373E+00 |
| D: | −1.6647E+00 | 5.0018E+00 | 5.3587E+00 | 3.3401E+00 | −7.9795E+00 |
| E: | 1.0684E+00 | −6.5507E+00 | −5.3250E+00 | −2.3613E+00 | 7.7685E+00 |
| F: | −2.6268E−01 | 3.1525E+00 | 1.8725E+00 | 6.4374E−01 | −2.8429E+00 |

| surface | 8 | 9 | 10 | 11 | 12 |
|---|---|---|---|---|---|
| K: | 2.5509E−01 | 3.3679E+00 | −4.8114E+00 | −2.2355E+02 | −6.5621E+00 |
| A: | −4.0340E−02 | 2.5517E−01 | −4.9189E−01 | −4.0410E−02 | −1.3418E−01 |
| B: | −9.5486E−01 | −1.4262E−01 | 1.4053E+00 | −1.9189E−01 | 6.9369E−02 |

TABLE 6-continued

| | | | Aspheric coefficients | | |
|---|---|---|---|---|---|
| C: | 2.2527E+00 | −1.2850E+00 | −2.6957E+00 | 2.1541E−01 | −3.1750E−02 |
| D: | −2.9951E+00 | 3.1516E+00 | 2.8666E+00 | −9.1240E−02 | 9.1070E−03 |
| E: | 2.4180E+00 | −2.5396E+00 | −1.4614E+00 | 1.7874E−02 | −1.4100E−03 |
| F: | −8.2645E−01 | 6.8703E−01 | 2.8086E−01 | −1.3500E−03 | 1.4200E−06 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f | 2.894 | f23/f45 | −0.2347 |
| Fno | 2.0 | f12/f34 | 2.6567 |
| FOV | 79 | f34/f5 | −1.0724 |
| f1/f2 | −0.6647 | f1/f234 | 1.3237 |
| f2/f4 | −2.0093 | f234/f5 | −1.2440 |
| f4/f5 | −1.0629 | f123/f4 | 2.4839 |
| f1/f3 | 0.0407 | f123/f45 | 0.2774 |
| f2/f5 | 2.1356 | V1-V2 | 34.5 |
| f1/f4 | 1.3356 | V4-V3 | 34.5 |
| f1/f23 | −0.6356 | f/TL | 0.7604 |
| f23/f4 | −2.1014 | | |

In the present optical imaging lens, the lens elements can be made of plastic or glass. If the lens elements are made of plastic, the cost will be effectively reduced. If the lens elements are made of glass, there is more freedom in distributing the refractive power of the optical imaging lens. Plastic lens elements can have aspheric surfaces, which allow more design parameter freedom (than spherical surfaces), so as to reduce the aberration and the number of the lens elements, as well as the total track length of the optical imaging lens.

In the present optical imaging lens, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The optical imaging lens of the present invention can be used in focusing optical systems and can obtain better image quality. The optical imaging lens of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens, comprising:
a stop;
a first lens element with a positive refractive power, having an object-side surface being convex near an optical axis and an image-side surface being convex near the optical axis, at least one of the object-side surface and the image-side surface of the first lens element being aspheric;
a second lens element with a negative refractive power, having an object-side surface being convex near the optical axis, at least one of the object-side surface and an image-side surface of the second lens element being aspheric;
a third lens element with refractive power having an image-side surface being concave near the optical axis, at least one of an object-side surface and the image-side surface of the third lens element being aspheric;
a fourth lens element with a positive refractive power, having an object-side surface being concave near the optical axis and an image-side surface being convex near the optical axis, at least one of the object-side surface and the image-side surface of the fourth lens element being aspheric; and
a fifth lens element with a negative refractive power, having an object-side surface being concave near the optical axis and an image-side surface being concave near the optical axis, at least one of the object-side surface and the image-side surface being aspheric and provided with at least one inflection point;
wherein a focal length of the first lens element is f1, a focal length of the third lens element is f3, a focal length of the second lens element, the third lens element and the fourth lens element combined is f234, a focal length of the fifth lens element is f5, and they satisfy the relations:

$-0.1 < f1/f3 \leq 0.0407$;

$-1.8 < f234/f5 < -1.0$.

2. The optical imaging lens as claimed in claim 1, wherein each of the second and third lens elements has the object-side surface being convex near the optical axis, and the image-side surface being concave near the optical axis.

3. The optical imaging lens as claimed in claim 1, wherein the focal length of the first lens element is f1, a focal length of the second lens element is f2, and they satisfy the relation: $-0.75 < f1/f2 < -0.4$.

4. The optical imaging lens as claimed in claim 1, wherein a focal length of the second lens element is f2, a focal length of the fourth lens element is f4, and they satisfy the relation: $-2.6 < f2/f4 < -1.8$.

5. The optical imaging lens as claimed in claim 1, wherein a focal length of the fourth lens element is f4, the focal lens of the fifth lens element is f5, and they satisfy the relation: $-1.35 < f4/f5 < -0.9$.

6. The optical imaging lens as claimed in claim 1, wherein a focal length of the second lens element is f2, the focal lens of the fifth lens element is f5, and they satisfy the relation: $1.8 < f2/f5 < 3.1$.

7. The optical imaging lens as claimed in claim 1, wherein the focal length of the first lens element is f1, a focal length of the fourth lens element is f4, and they satisfy the relation: 0.9<f1/f4<1.5.

8. The optical imaging lens as claimed in claim 1, wherein the focal length of the first lens element is f1, a focal length of the second lens element and the third lens element combined is f23, and they satisfy the relation: −0.7<f1/f23<−0.5.

9. The optical imaging lens as claimed in claim 1, wherein a focal length of the second lens element and the third lens element combined is f23, a focal length of the fourth lens element and the fifth lens element combined is f45, and they satisfy the relation: −0.35<f23/f45<−0.05.

10. The optical imaging lens as claimed in claim 1, wherein a focal length of the first lens element and the second lens element combined is f12, a focal length of the third lens element and the fourth lens element combined is f34, and they satisfy the relation: 1.4<f12/f34<2.8.

11. The optical imaging lens as claimed in claim 1, wherein a focal length of the third lens element and the fourth lens element combined is f34, the focal length of the fifth lens element is f5, and they satisfy the relation: −1.4<f34/f5<−0.9.

12. The optical imaging lens as claimed in claim 1, wherein the focal length of the first lens element is f1, the focal length of the second lens element, the third lens element and the fourth lens element combined is f234, and they satisfy the relation: 0.6<f1/f234<1.5.

13. The optical imaging lens as claimed in claim 1, wherein a focal length of the second lens element and the third lens element combined is f23, a focal length of the fourth lens element is f4, and they satisfy the relation: −2.3<f23/f4<−1.5.

14. The optical imaging lens as claimed in claim 1, wherein a focal length of the first lens element, the second lens element and the third lens element combined is f123, a focal length of the fourth lens element is f4, and they satisfy the relation: 1.6<f123/f4<2.7.

15. The optical imaging lens as claimed in claim 1, wherein a focal length of the first lens element, the second lens element and the third lens element combined is f123, a focal length of the fourth lens element and the fifth lens element combined is f45, and they satisfy the relation: 0.05<f123/f45<0.4.

16. The optical imaging lens as claimed in claim 1, wherein an Abbe number of the first lens element is V1, an Abbe number of the second lens element is V2, and they satisfy the following relation: 30<V1−V2<42.

17. The optical imaging lens as claimed in claim 1, wherein an Abbe number of the fourth lens element is V4, an Abbe number of the third lens element is V3, and they satisfy the following relation: 30<V4−V3<42.

18. The optical imaging lens as claimed in claim 1, wherein a focal length of the optical imaging lens is f, a distance from the object-side surface of the first lens element to an image plane along the optical axis is TL, and they satisfy the relation: 0.6<f/TL<0.95.

* * * * *